(12) United States Patent
Li (10) Patent No.: US 11,315,444 B2
(45) Date of Patent: Apr. 26, 2022

(54) SUITCASE AND SUITCASE SYSTEM

(71) Applicant: Zhejiang Geely Holding Group Co., LTD., Hangzhou (CN)

(72) Inventor: Shufu Li, Hangzhou (CN)

(73) Assignee: ZHEJIANG GEELY HOLDING GROUP CO., LTD., Hangzhou (CN)

( * ) Notice: Subject to any disclaimer, the term of this patent is extended or adjusted under 35 U.S.C. 154(b) by 131 days.

(21) Appl. No.: 16/644,943

(22) PCT Filed: May 10, 2019

(86) PCT No.: PCT/CN2019/086306
§ 371 (c)(1),
(2) Date: Mar. 5, 2020

(87) PCT Pub. No.: WO2019/223549
PCT Pub. Date: Nov. 28, 2019

(65) Prior Publication Data
US 2021/0125526 A1    Apr. 29, 2021

(30) Foreign Application Priority Data

May 21, 2018   (CN) .......................... 201810489584.1

(51) Int. Cl.
*G09F 9/30*     (2006.01)
*A45C 5/04*     (2006.01)
(Continued)

(52) U.S. Cl.
CPC ................ *G09F 9/301* (2013.01); *A45C 5/04* (2013.01); *A45C 5/14* (2013.01); *A45C 15/00* (2013.01)

(58) Field of Classification Search
CPC .. G06F 1/1652; G09G 3/3266; G09G 3/3275; G09F 9/30; G09F 9/301; G09F 21/00;
(Continued)

(56) References Cited

U.S. PATENT DOCUMENTS

| 5,941,000 A | 8/1999 | Sadow |
| 2011/0016018 A1* | 1/2011 | Smith ...................... A45C 5/02 705/26.5 |

(Continued)

FOREIGN PATENT DOCUMENTS

| CN | 1411573 A | 4/2003 |
| CN | 102737563 A | 10/2012 |

(Continued)

*Primary Examiner* — Joe H Cheng
(74) *Attorney, Agent, or Firm* — Cheng-ju Chiang (57) ABSTRACT

A suitcase includes a case body. The case body is provided with rolling wheels and a pull rod. A foldable display screen is provided on an outer surface of the case body. The display screen includes a fixed first display unit and at least one second display unit which is foldable relative to the first display unit. When the display screen is in the folded state, the at least one second display unit is folded on and overlapped with the first display unit. After the at least one second display unit is unfolded relative to the first display unit, the display screen is in the unfolded state, and the display area of the display screen is equal to the sum of the first display unit and the at least one second display unit.

16 Claims, 10 Drawing Sheets

(51) Int. Cl.
*A45C 5/14* (2006.01)
*A45C 15/00* (2006.01)

(58) Field of Classification Search
CPC ........ G09F 3/30; G09F 3/301; G02F 1/13452;
A45C 5/04; A45C 5/045; A45C 5/14;
A45C 13/001; A45C 15/00; A45C 13/18;
H01L 27/124; H01L 27/3276; H05K
2201/101258; H05K 2201/10128; H04W
4/025; H04W 4/029
See application file for complete search history.

(56) References Cited

U.S. PATENT DOCUMENTS

| | | | | |
|---|---|---|---|---|
| 2012/0280924 | A1* | 11/2012 | Kummer | G06F 1/1647 345/173 |
| 2015/0116364 | A1* | 4/2015 | Aurongzeb | G06F 1/3265 345/659 |
| 2015/0348347 | A1* | 12/2015 | Diz | B60B 5/02 340/5.61 |
| 2016/0255928 | A1* | 9/2016 | O'Donnell | A45C 9/00 |
| 2016/0307480 | A1* | 10/2016 | Carlus | A45C 15/00 |
| 2017/0220040 | A1 | 8/2017 | London | |
| 2018/0063312 | A1 | 3/2018 | Jong | |
| 2018/0087955 | A1* | 3/2018 | Lu | G01G 23/005 |
| 2018/0116361 | A1 | 5/2018 | Anjum et al. | |
| 2018/0329521 | A1* | 11/2018 | Hesketh | H04N 7/142 |
| 2020/0000193 | A1* | 1/2020 | Qi | G05D 1/0016 |

FOREIGN PATENT DOCUMENTS

| | | | | |
|---|---|---|---|---|
| CN | 203179109 | U | | 9/2013 |
| CN | 204015441 | U | | 12/2014 |
| CN | 105607397 | A | * | 5/2016 |
| CN | 205358578 | U | | 7/2016 |
| CN | 205390701 | U | | 7/2016 |
| CN | 205656831 | U | | 10/2016 |
| CN | 205884961 | U | | 1/2017 |
| CN | 206675155 | U | | 11/2017 |
| CN | 207383754 | U | * | 5/2018 |
| CN | 108813858 | A | | 11/2018 |
| JP | 2010-522474 | A | | 7/2010 |
| JP | WO2012/090335 | A1 | | 7/2012 |
| JP | WO2012090335 | A1 | * | 6/2014 ......... G08B 13/1427 |
| JP | 2015-213721 | A | | 12/2015 |
| JP | 3212279 | U | | 8/2017 |
| JP | 2018-73210 | A | | 5/2018 |

* cited by examiner

SUITCASE AND SUITCASE SYSTEM

CROSS-REFERENCE TO RELATED APPLICATION

The present application is a 35 U.S.C. § 371 National Phase conversion of International Patent Application No. PCT/CN2019/086306, filed on May 10, 2019, which is based on and claims priority of Chinese patent application No. 201810489584.1, filed on May 21, 2018. The entire disclosure of the above-identified applications is incorporated herein by reference. The PCT International Patent Application was filed and published in English.

TECHNICAL FIELD

The present application relates to luggage boxes, and particularly to a suitcase and a suitcase system.

BACKGROUND ART

The luggage box as a container of luggage has been more and more applied to people's daily travel. For example, during a business trip, a travel or on a vacation, various kinds of luggage boxes provide great convenience in helping people carrying essential goods, such as clothes or other things. Among them, the suitcase with rolling wheels provided at the bottom is much popular, because it saves manpower by relying on the rolling wheels to move plus the design of the pull rod.

During a traveling, people usually carry some electronic devices, such as smart phones, tablets or laptops, but the display screen size of these electronic devices is generally small. If the users need to watch videos or share information with others in the course of the travel, the display effect with a small screen cannot meet the actual needs.

Technical Solution

The object of the present application is to provide a suitcase. The suitcase can display information by using a display screen provided thereon, to solve the problem that the display screen size of an electronic device is small and cannot meet the actual needs.

An embodiment of the present application provides a suitcase. The suitcase includes a case body. The case body is provided with rolling wheels and a pull rod. A foldable display screen is provided on an outer surface of the case body. The display screen includes a fixed first display unit and at least one second display unit which is foldable relative to the first display unit. When the display screen is in the folded state, the at least one second display unit is folded on and overlapped with the first display unit. After the at least one second display unit is unfolded relative to the first display unit, the display screen is in the unfolded state, and the display area of the display screen is equal to the sum of the first display unit and the at least one second display unit.

Further, the display screen is a flexible display screen.

Further, the display screen is provided on a front surface, a rear surface or two side surfaces of the case body.

Further, the at least one second display unit is a single one, the second display unit is rotatably connected with a side edge of the first display unit, and in the unfolded state, the second display unit is located at one side of the first display unit.

Further, the display area of the first display unit wholly covers the outer surface of the case body on which the display screen is provided, and the display area of the second display unit is equal to that of the first display unit.

Further, the display area of the first display unit covers one half of the case body on which the display screen is provided, and the display area of the second display unit is equal to that of the first display unit.

Further, the at least one second display unit has two in number, the two second display units are rotatably connected to two opposite side edges of the first display unit, and in the unfolded state, the two second display unit are located at two opposite sides of the first display unit.

Further, the display area of the first display unit wholly covers the outer surface of the case body on which the display screen is provided, and the display area of each second display unit is equal to that of the first display unit.

Further, the display area of the first display unit wholly covers the outer surface of the case body on which the display screen is provided, and the display area of each second display unit is one half of the display area of the first display unit.

Further, the first display unit is located in the middle portion of the case body on which the display screen is provided, the display area of the first display unit covers one third of the outer surface of the case body on which the display screen is provided, and the display area of each second display unit is equal to that of the first display unit.

Further, the suitcase includes a battery and an electric generator, the electric generator is connected with the battery and the rolling wheels, the electric generator is used to generate electricity under the driving of the rolling wheels for charging the battery.

Further, the suitcase includes a wireless module, the wireless module is used to connected to the Internet or the user's electronic device.

Further, the suitcase includes a positioning module, the positioning module is used to locate the position of the suitcase in real time, and the positioning information of the suitcase is sent to the user's electronic device through the wireless module.

Further, the suitcase includes a processor, a memory and an operating system, the memory is connected to the processor, the display screen has touch input function.

An embodiment of the present application further provides a suitcase system. The suitcase system includes an electronic device and a suitcase, the electronic device and the suitcase are connected wirelessly.

Advantageous Effects

The suitcase in the embodiment of the present application are provided with a foldable display screen, wherein the second display unit can be unfolded relative to the first display unit, to effectively increase the display area in displaying, so that the users can enjoy the display effect of a large screen when watching videos or sharing information with others in the course of business trips, thereby greatly enhancing the user experience.

MODE FOR INVENTION

In order to make the purposes, characteristics, and advantages of the present application more apparently, embodiments of the present application will now be described in detail with reference to the drawing figures.

First Embodiment

Figure 1A:
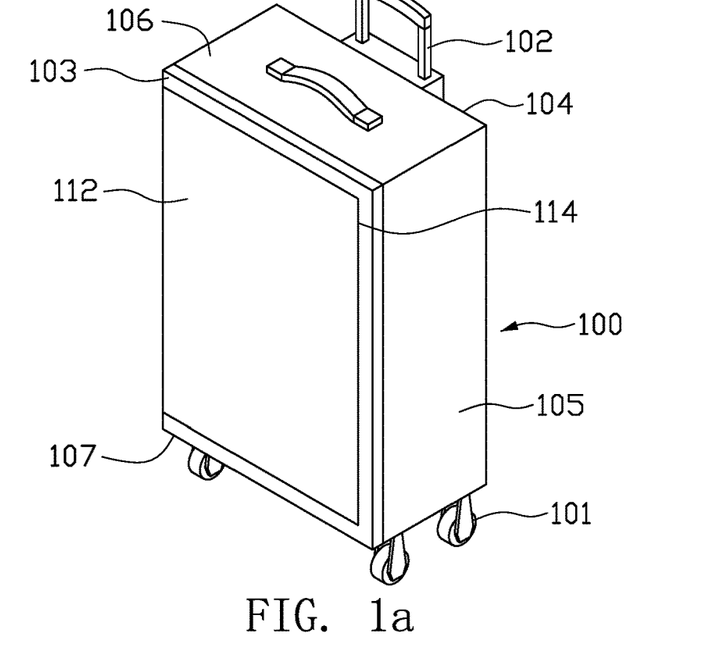
FIG. 1a is a schematic view showing the display screen of a suitcase in a folded state according to a first embodiment of the present application.
Figure 1B:
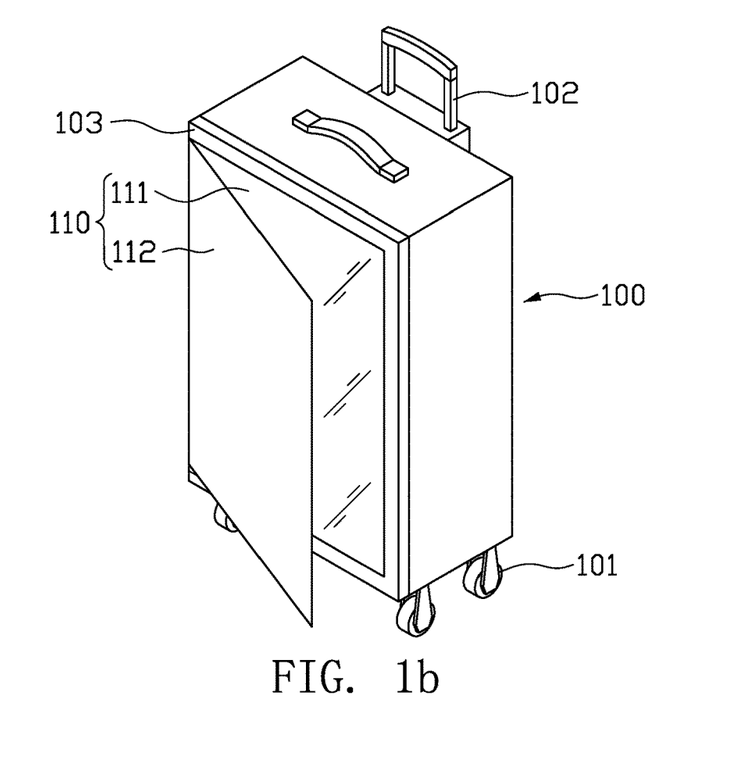
FIG. 1b is a schematic view showing the display screen of a suitcase being unfolded from a folded state towards an unfolded state according to the first embodiment of the present application.
Figure 1C:
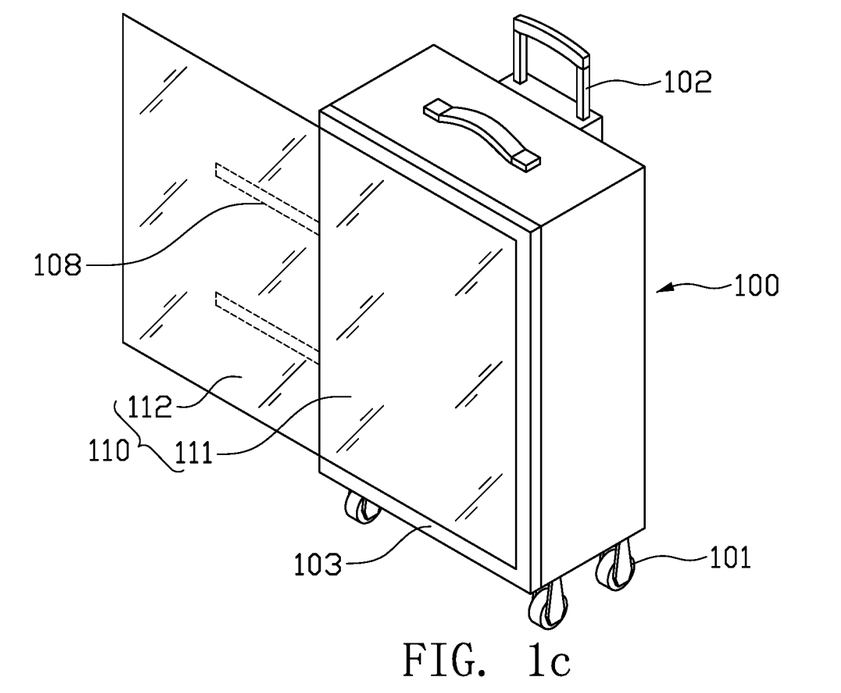
FIG. 1c is a schematic view showing the display screen of a suitcase in an unfolded state according to the first embodiment of the present application.

Referring from FIG. 1a to FIG. 1c, a suitcase is provided according to a first embodiment of the present application. The suitcase includes a case body 100. The case body 100 is provided with rolling wheels 101 and a pull rod 102. The rolling wheels 101 are multiple and mounted at the bottom of the case body 100. The multiple rolling wheels 101 may include a left front wheel, a right front wheel, a left rear wheel and a right rear wheel. The pull rod 102 is mounted at the top of the case body 100 and is retractable relative to the case body 100 so as to adjust its extension length.

A foldable display screen 110 is provided on an outer surface of the case body 100. The display screen 110 may be a flexible display screen, for example, OLED (organic light-emitting diode) display screen. The OLED display can be made of flexible materials, so that it can be easily folded or bent.

The outer surfaces of the case body 100 may include a front surface 103, a rear surface 104, two side surfaces 105, a top surface 106 and a bottom surface 107. The display screen 110 can be provided on the front surface 103, the rear surface 104 or the two side surfaces 105 of the case body 100. In the embodiment, the display screen 110 is illustrated as being provided on the front surface 103 of the case body 100, but it is not limited thereto. In other embodiments, the display screen 110 may also be provided on the rear surface 104 or the two side surfaces 105 of the case body 100. When the display screen 110 is provided on the front surface 103 or the rear surface 104 of the case body 100, a larger display area may be obtained. When the display screen 110 is provided on the two side surfaces 105 of the case body 100, the probability of the display screen 110 being squeezed or collided may be reduced.

The display screen 110 includes a fixed first display unit 111 and at least one second display unit 112 which is foldable relative to the first display unit 111. The at least one second display unit 112 can switch between a folded state and an unfolded state. As shown in FIG. 1a, when the display screen 110 is in the folded state, the at least one second display unit 112 is folded on and overlapped with the first display unit 111, to reduce the size of the display screen 110 when it is not in use. As shown in FIG. 1b, the at least one second display unit 112 is being unfolded from the folded state towards the unfolded state. As shown in FIG. 1c, after the at least one second display unit 112 is unfolded relative to the first display unit 111, the display screen 110 is in the unfolded state, the first display unit 111 and the at least one second display unit 112 are connected side by side and located at the same plane, and the display area of the display screen 110 is equal to the sum of the first display unit 111 and the at least one second display unit 112, so as to greatly increase the display area of the display screen 110 in use.

In the embodiment, the at least one second display unit 112 is a single one, the second display unit 112 is rotatably connected with a side edge (e.g., left side edge) of the first display unit 111. In the unfolded state, the second display unit 112 is located at one side (e.g., left side) of the first display unit 111.

In the embodiment, the display area of the first display unit 111 wholly covers the outer surface of the case body 100 on which the display screen 110 is provided. That is, the display area of the first display unit 111 wholly covers the front surface 103 of the case body 100. The display area of the second display unit 112 is equal to that of the first display unit 111.

The dimensions for suitcases usually vary from 16 inches to 30 inches. In the embodiment, after the second display unit 112 is unfolded, the expanded screen size will exceed the outer surface of the case body 100, thereby effectively increasing the display area of the screen, so that even if the suitcase has a small size, such as less than 20 inches, a relatively large display area can be obtained after unfolding the second display unit 112 of the foldable display screen 110.

In the embodiment, when the second display unit 112 exceeds the outer surface of the case body 100 after being unfolded, a support mechanism may be provided to support the unfolded second display unit 112. For example, a plurality of support bars 108 may be provided on the case body 100, and each support bar 108 is rotatably connected to the case body 100. When it needs to support the unfolded second display unit 112, as shown in FIG. 1c, the support bars 108 rotate outwards from the case body 100 to support the back portion of the unfolded second display unit 112. When the second display unit 112 is in the folded state and no support is needed, the support bars 108 rotate back to the case body 100.

Specifically, a receiving groove 114 may be provided in the outer surface of the case body 100 on which the display screen 110 is provided. In the folded state, the second display unit 112 is received in the receiving groove 114, to prevent the second display unit 112 from protruding out of the outer surface of the case body 100. In the folded state, the second display unit 112 received in the receiving groove 114 may be fixed to the case body 100 by zipper, snap, lock, magnetism, etc. When requiring to unfold the second display unit 112, it is only needed to unlock the second display unit 112 from the case body 100, so that the second display unit 112 can unfold relative to the first display unit 111.

The outer surface of the case body 100 can be made of hard materials, such as carbon fibers, engineering plastics, toughened glass, etc. It can be used to protect the display screen 110, so that the display screen 110 will not be damaged even if it is squeezed or collided to a certain extent. It can also be waterproof and dust-proof, without worrying about the impact of extrusion, collision, rainwater, dust and other external factors on the display screen 110.

Figure 2:
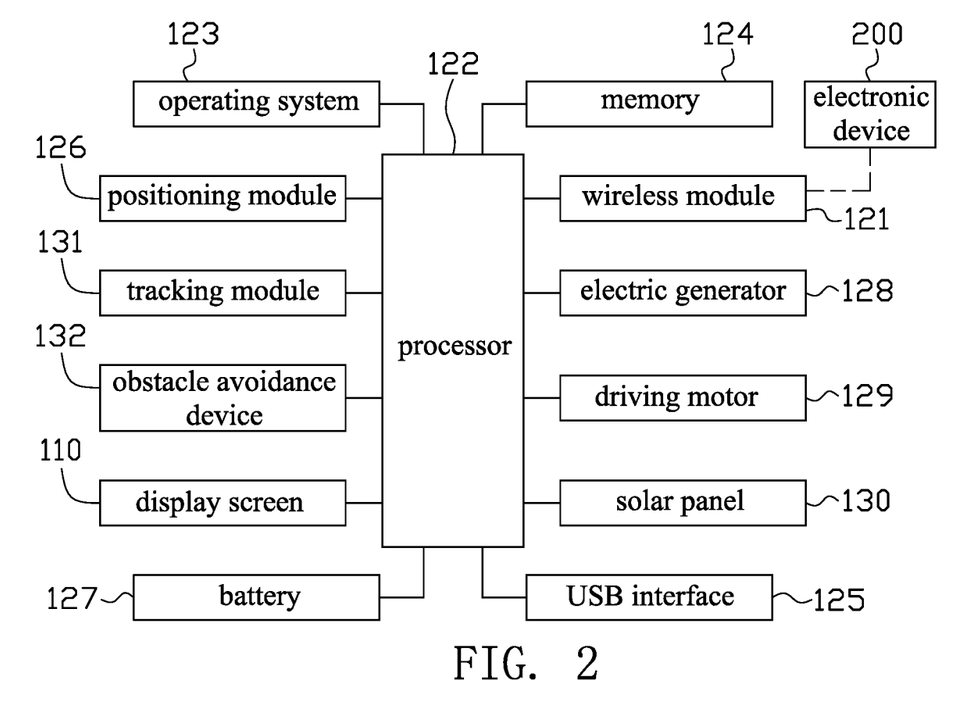
FIG. 2 is a block diagram of the suitcase according to the first embodiment of the present application.

Referring to FIG. 2, the suitcase provided by the embodiment may further include a wireless module 121. The suitcase may be connected to the Internet or the user's electronic device 200 through the wireless module 121. Through the wireless connection of the suitcase, the information content in the electronic device 200 can be transmitted to the display screen 110 of the suitcase for display. In use, the content in the electronic device 200 needed to be displayed is transmitted to the suitcase wirelessly, and then the suitcase sents the received content to the display screen 110 for display. Due to the foldable structure of the display screen 110, the second display unit 112 can be unfolded relative to the first display unit 111, to effectively increase the display area in displaying, so that the users can enjoy the display effect of a large screen when watching videos or sharing information with others in the course of business trips, thereby enhancing the user experience. The wireless module 121 can use communication technologies such as Bluetooth, WiFi, Zigbee, 3G, 4G, 5G. Normally, the display screen 110 can be used to display time information, flight information, power information, etc., when the information content in the electronic device 200 is not needed to be displayed on the display screen 110.

The suitcase may further include a processor 122, a memory 124 and an operating system 123. The memory 124 is connected to the processor 122. Preferably, the display screen 110 has touch input function, which is convenient for the user to perform input operations on the suitcase. Due to the operating system 123, the suitcase can download and run various application programs independently, enabling the suitcase to become a large mobile electronic device beside the user.

When the suitcase is connected to the Internet through the wireless module 121, videos and other contents can be downloaded directly from the Internet network, then stored in the memory 124 and played through the display screen 110.

The suitcase may further include a USB interface 125. The USB interface 125 is provided on the case body 100, and the USB interface 125 is connected to the processor 122. Data can also be input into the memory 124 of the suitcase through the USB interface 125. For example, the electronic device 200 can be connected to the USB interface 125 through data line, and data in the electronic device 200 can be copied to the memory 124 of the suitcase.

Since the suitcase has the wireless connection function, if the user forgets to turn off the wireless connection function and the suitcase has been put into the luggage compartment of an airplane, it will not be able to turn off its wireless connection function or switch it to the flight mode, which may affect the flight safety. In addition, after closing the wireless connection function or switching to the flight mode, if the wireless connection function cannot be opened in time after the suitcase is off the airplane, it will cause loss of contact between the suitcase and the user. In the embodiment, the suitcase may connect with the Internet or connect with the electronic device 200 of the user via the wireless module 121, to automatically acquire the flight information of the user and obtain the actual take-off time and landing time of the flight, so that the flight mode can be automatically opened at the take-off time and automatically closed at the landing time of the flight. In this way, there is no worry about forgetting to close the wireless connection function of the suitcase during the take-off time of the flight, and no worry about losing contact with the suitcase after the flight lands on.

If the suitcase carried by the user has been consigned when the user gets on an airplane, it is impossible to know the exact location or distance of the suitcase after the user gets off the airplane. As a result, the user cannot predict the time of picking up the suitcase, and it is inconvenient to the user. In order to avoid this situation, the suitcase may include a positioning module 126, which is used to locate the position of the suitcase in real time. The positioning information of the suitcase is sent to the user's electronic device 200 through the wireless module 121. The location of the suitcase and the distance between the suitcase and the user can be displayed on the electronic device 200. In this way, the user can know the current position of the suitcase in the consignment state of the suitcase, such that the time of picking up the suitcase can be well predicted. It can also avoid the loss of the suitcase. Even if the suitcase is lost, it is convenient to trace it back.

The positioning module 126 can use GPS positioning system or base stations provided by mobile operator to locate the suitcase. The GPS positioning system can be used in outdoors, but when the indoor GPS signal is not good, the base stations of mobile operator can be used to locate the suitcase in order to improve the accuracy of locating.

The suitcase further includes a battery 127. The battery 127 is used to supply power for various components of the suitcase that need electricity. The battery 127 may be a lithium-ion battery that can be charged repeatedly. The battery 127 can be detached from the case body 100 to be charged separately. The USB interface 125 is further connected to the battery 127, such that the electronic device 200 carried by the user can be charged via the USB interface 125 during a trip.

The suitcase may further include an electric generator 128 connected with the battery 127. The electric generator 128 is arranged at the bottom of the case body 100. The electric generator 128 includes a stator and a rotor. The rotor is connected with the rolling wheel 101 in order to rotate concurrently. When the suitcase is pulled to move, the rolling wheel 101 drives the electric generator 128 to generate electricity for charging the battery 127.

The suitcase may further include a driving motor 129. The driving motor 129 is connected with the battery 127, so that the battery 127 can provide power for the driving motor 129. The rolling wheel 101 is mounted on a rotating shaft (not shown). The output shaft of the driving motor 129 is connected with the rotating shaft, so that the rolling wheel 101 of the suitcase is driven by the driving motor 129, for helping drive the suitcase to move. For example, a button may be provided on the pull rod 102, when the user pushes the suitcase to move with his hand holding on the pull rod 102, the user may press down the button to cause the driving motor 129 to be energized by the battery 127, so that the driving motor 129 can help drive the suitcase to move ahead.

In the embodiment, the electric generator 128 may be provided independently of the driving motor 129. Optionally, the electric generator 128 and the driving motor 129 may be integrated together.

In addition, there may be provided with solar panels 130 on the outer surfaces of the case body 100. The solar panels 130 can be used to generate electricity for charging the battery 127.

The suitcase may further include a tracking module 131. The tracking module 131 and the driving motor 129 are connected with the processor 122. The tracking module 131 may include a plurality of ranging sensors provided on the case body 100. The tracking module 131 can track and follow the user automatically according to the theory of locating based on received signal strength indicator (RSSI). In the RSSI locating, the intensity of a signal emitted by the emitting node is known, the receiving node calculates the attenuation of the signal in the transmission process based on the intensity of the received signal, and the distance between the two nodes is calculated out according to the relationship between the signal attenuation and the transmission distance. For example, the electronic device 200 carried by the user can be the emitting node, the ranging sensors provided on the suitcase can be the receiving node. The two nodes may use WiFi, Bluetooth, infrared rays to transmit the signals and realize the tracking. Through the tracking module 131, it can detect the distance between the suitcase and the electronic device 200 and the moving speed of the electronic device 200, the processor 122 then accordingly outputs control signals to the driving motor 129 to control the acceleration, deceleration and steering operations of the driving motor 129, and automatically adjust the moving speed and direction of the suitcase, so that the suitcase tracks and follows the electronic device 200 (i.e., the user) and the suitcase and the electronic device 200 are always kept at the preset distance. Due to the automatic tracking function of the suitcase, it can reduce the burden of the user, and the travel experience is enhanced.

The suitcase may further include an obstacle avoidance device 132. The obstacle avoidance device 132 is connected to the processor 122. The obstacle avoidance device 132 is used to detect the obstacles that may be existed in a surrounding environment of the suitcase. During the course of the suitcase automatically tracking the user, when the obstacle avoidance device 132 detects that there are obstacles existed on the way ahead, the processor 122 outputs control signals to the driving motor 129, to cause the driving motor 129 to drive the case body 100 to move away from the obstacles, thereby improving the safety of the suitcase in the course of automatically tracking the user. The obstacle avoidance device 132 may include a plurality of ranging sensors provided on the outer surface of the case body 100. Since a propagation speed of a wireless signal (e.g., ultrasonic, infrared, laser, microwave, etc.) emitted by the ranging sensors is known in the air, the time is measured and obtained when the wireless signal after emission is reflected back by the obstacles, and the actual distance between the case body 100 and the obstacles is calculated out based on the time difference between the emission and the reception of the signal.

Second Embodiment

Figure 3A:
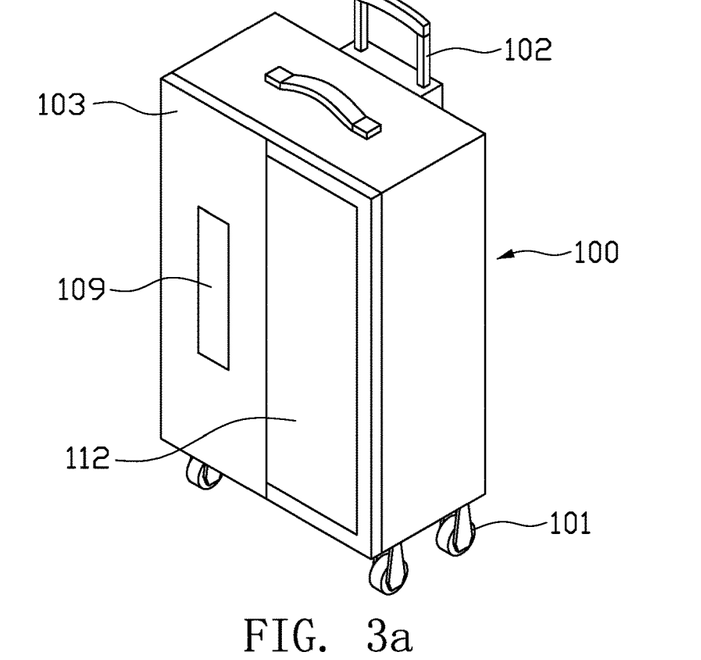
FIG. 3a is a schematic view showing the display screen of a suitcase in a folded state according to a second embodiment of the present application.
Figure 3B:
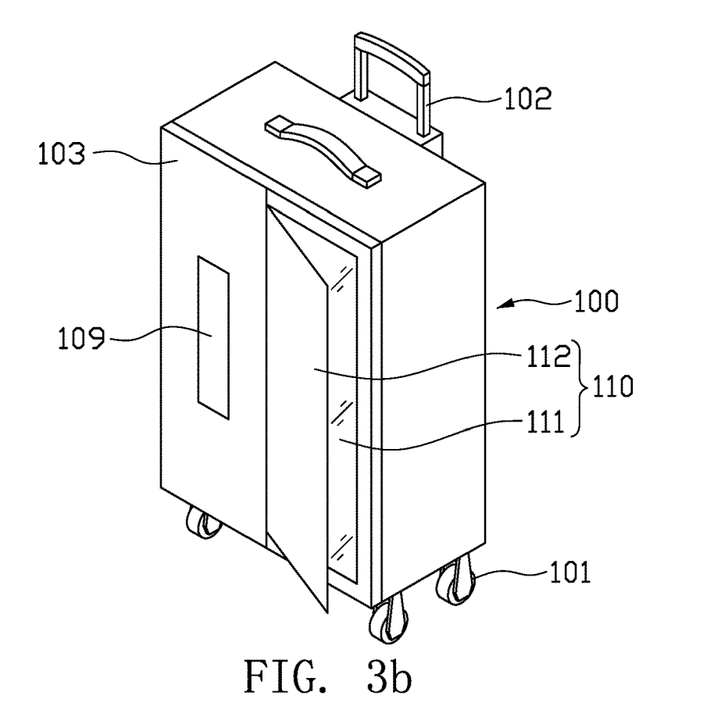
FIG. 3b is a schematic view showing the display screen of a suitcase being unfolded from a folded state towards an unfolded state according to the second embodiment of the present application.
Figure 3C:
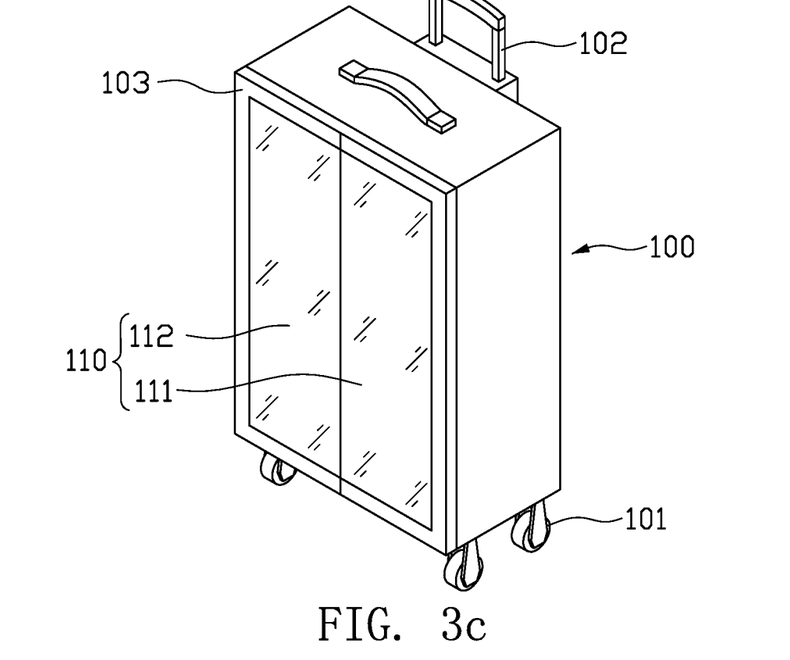
FIG. 3c is a schematic view showing the display screen of a suitcase in an unfolded state according to the second embodiment of the present application.

Referring from FIG. 3a to FIG. 3c, the main difference between the suitcase provided according to the second embodiment of the present invention and the above first embodiment is that, in this embodiment, the display area of the first display unit 111 covers one half of the outer surface of the case body 100 on which the display screen 110 is provided. The display area of the second display unit 112 is equal to that of the first display unit 111.

In this embodiment, after the second display unit 112 is unfolded, the expanded screen size after unfolding is basically the same as that of the outer surface of the case body 100. When the suitcase has a large size, such as larger than 20 inches, a relatively large display area can be obtained after unfolding the second display unit 112 of the foldable display screen 110.

In this embodiment, for the outer surface of the case body 100 on which the display screen 110 is provided, a storage pocket 109 is provided in the area without the screen. The storage pocket 109 can be used to conveniently place some daily necessities, such as paper towels, etc.

Third Embodiment

Figure 4A:
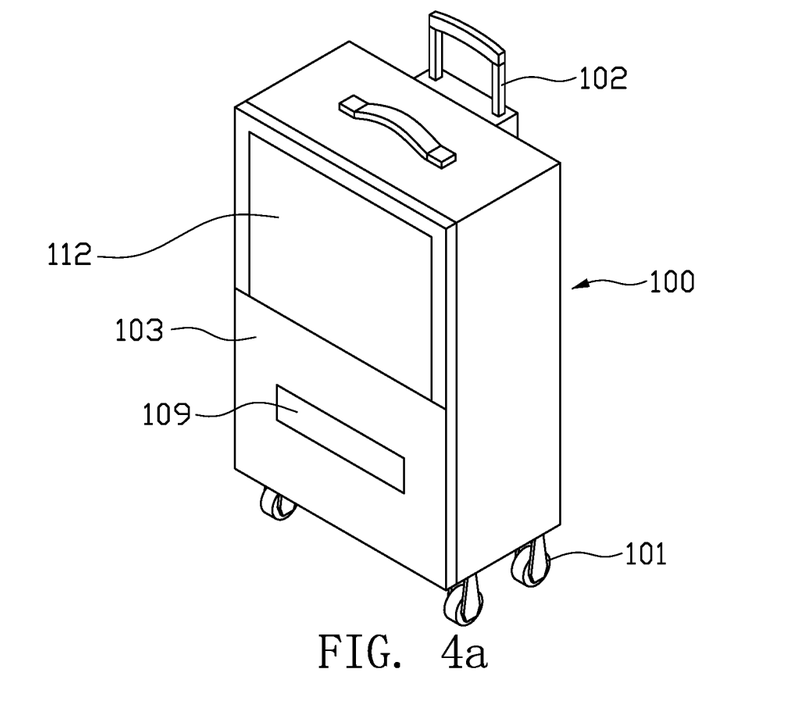
FIG. 4a is a schematic view showing the display screen of a suitcase in a folded state according to a third embodiment of the present application.
Figure 4B:
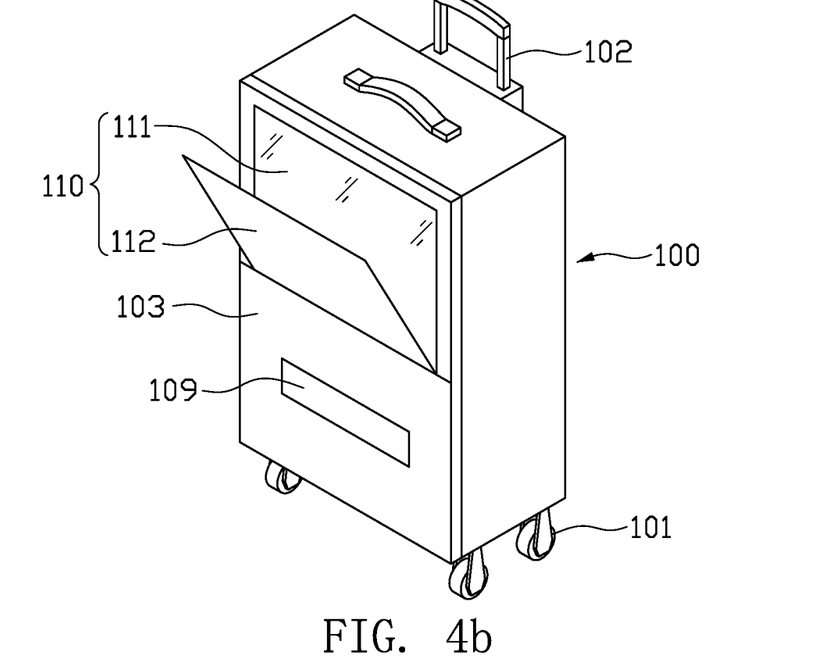
FIG. 4b is a schematic view showing the display screen of a suitcase being unfolded from a folded state towards an unfolded state according to the third embodiment of the present application.
Figure 4C:
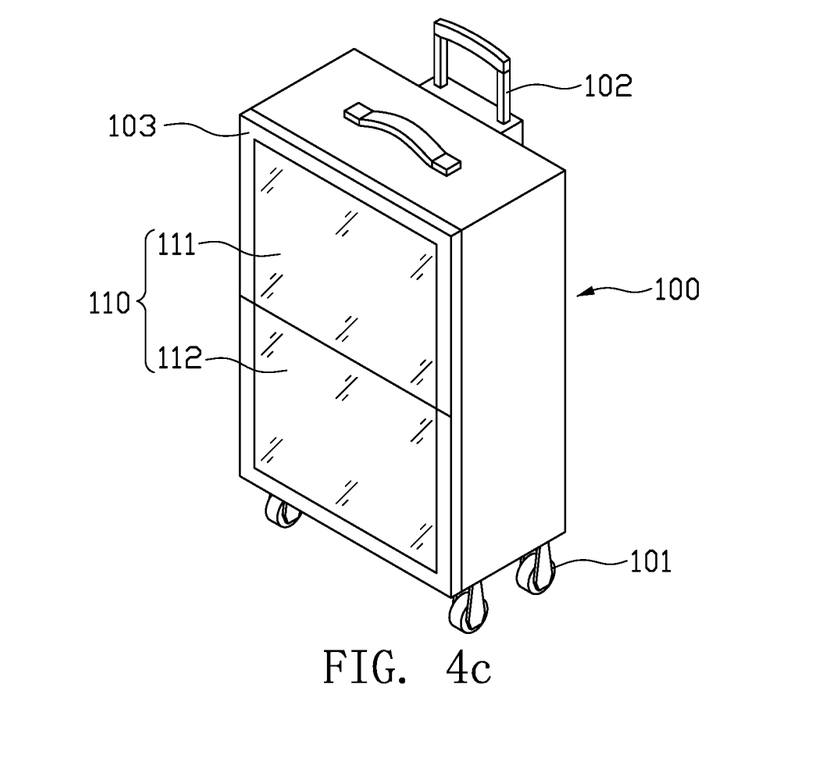
FIG. 4c is a schematic view showing the display screen of a suitcase in an unfolded state according to the third embodiment of the present application.

Referring from FIG. 4a to FIG. 4c, the suitcase provided according to the third embodiment of the present invention is basically the same as the second embodiment, except that the folding direction of the second display unit 112 relative to the first display unit 111. In the above second embodiment, the second display unit 112 is folded along left and right direction relative to the first display unit 111. However, in this embodiment, the second display unit 112 is folded along up and down direction relative to the first display unit 111.

Fourth Embodiment

Figure 5A:
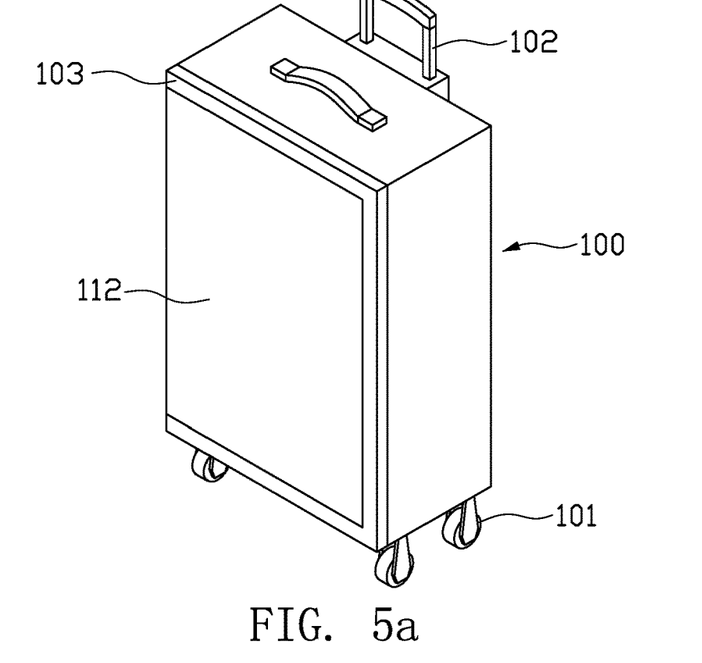
FIG. 5a is a schematic view showing the display screen of a suitcase in a folded state according to a fourth embodiment of the present application.
Figure 5B:
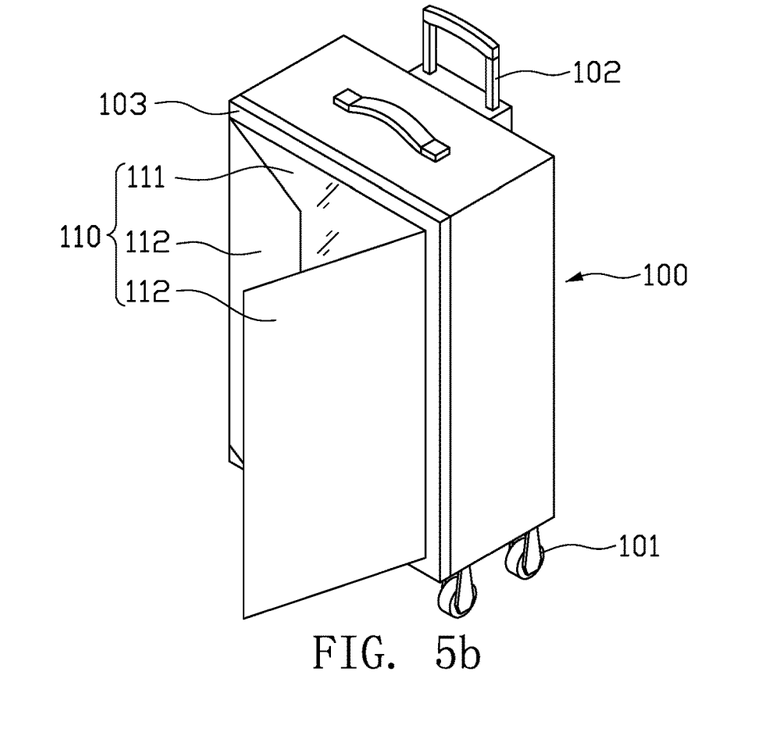
FIG. 5b is a schematic view showing the display screen of a suitcase being unfolded from a folded state towards an unfolded state according to the fourth embodiment of the present application.
Figure 5C:
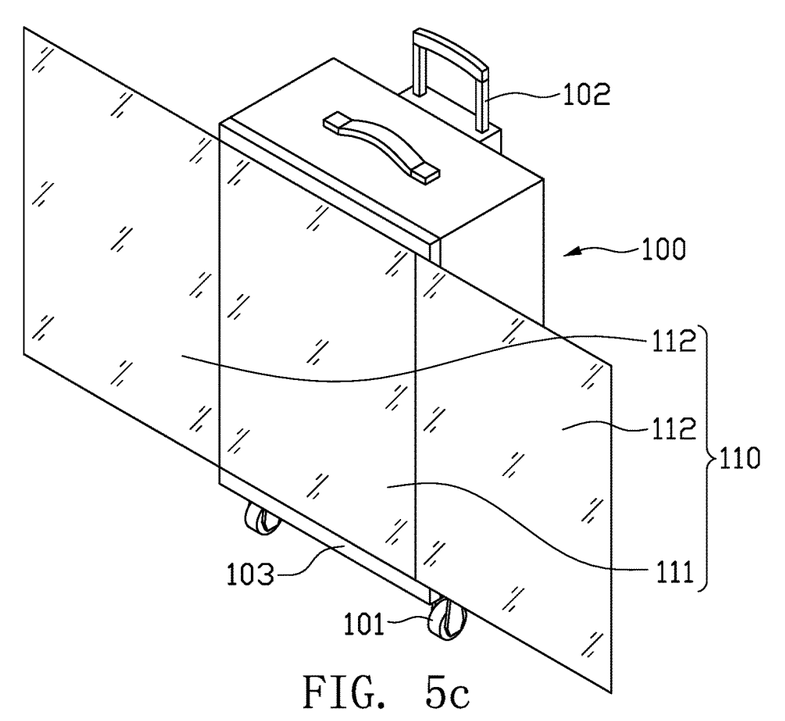
FIG. 5c is a schematic view showing the display screen of a suitcase in an unfolded state according to the fourth embodiment of the present application.

Referring from FIG. 5a to FIG. 5c, the main difference between the suitcase provided according to the fourth embodiment of the present invention and the above first embodiment is that, in this embodiment, the at least one second display unit 112 has two in number, and the two second display units 112 are rotatably connected to two opposite side edges of the first display unit 111, respectively. In the unfolded state, the two second display unit 112 are located at two opposite sides of the first display unit 111, respectively.

In this embodiment, the display area of the first display unit 111 wholly covers the outer surface of the case body 100 on which the display screen 110 is provided. The display area of each second display unit 112 is equal to that of the first display unit 111.

In this embodiment, after the second display unit 112 is unfolded, the expanded screen size will exceed the outer surface of the case body 100, thereby effectively increasing the display area of the screen, so that even if the suitcase has a small size, such as less than 20 inches, a relatively large display area can be obtained after unfolding the second display unit 112 of the foldable display screen 110.

Fifth Embodiment

Figure 6A:
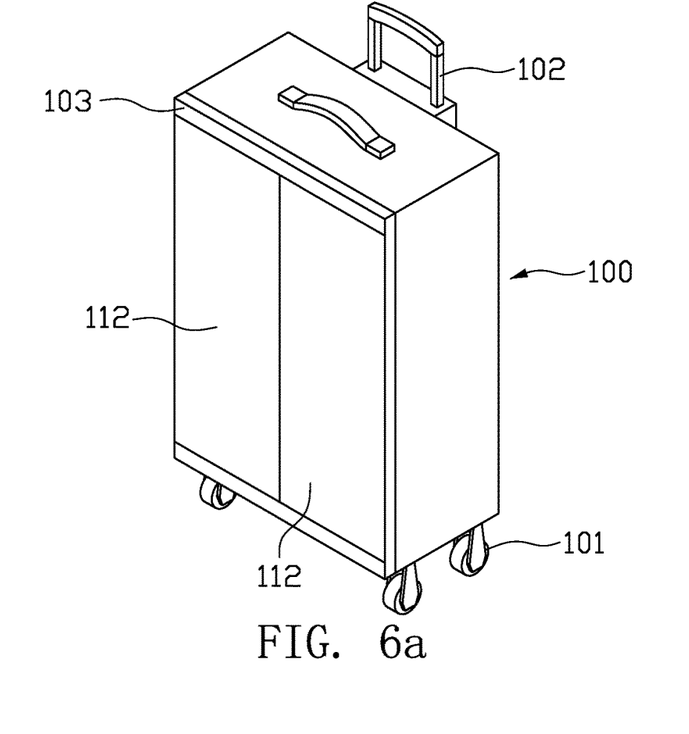
FIG. 6a is a schematic view showing the display screen of a suitcase in a folded state according to a fifth embodiment of the present application.
Figure 6B:
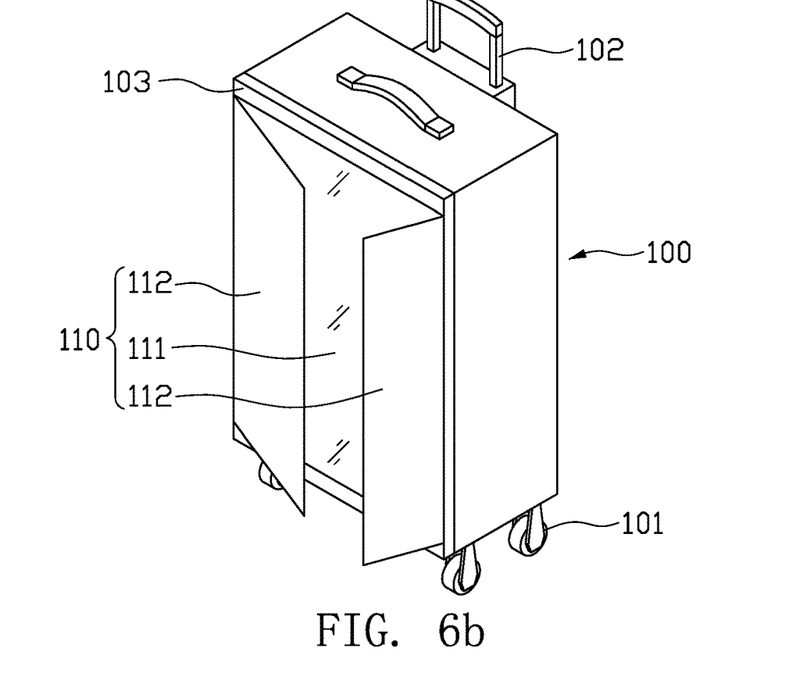
FIG. 6b is a schematic view showing the display screen of a suitcase being unfolded from a folded state towards an unfolded state according to the fifth embodiment of the present application.
Figure 6C:
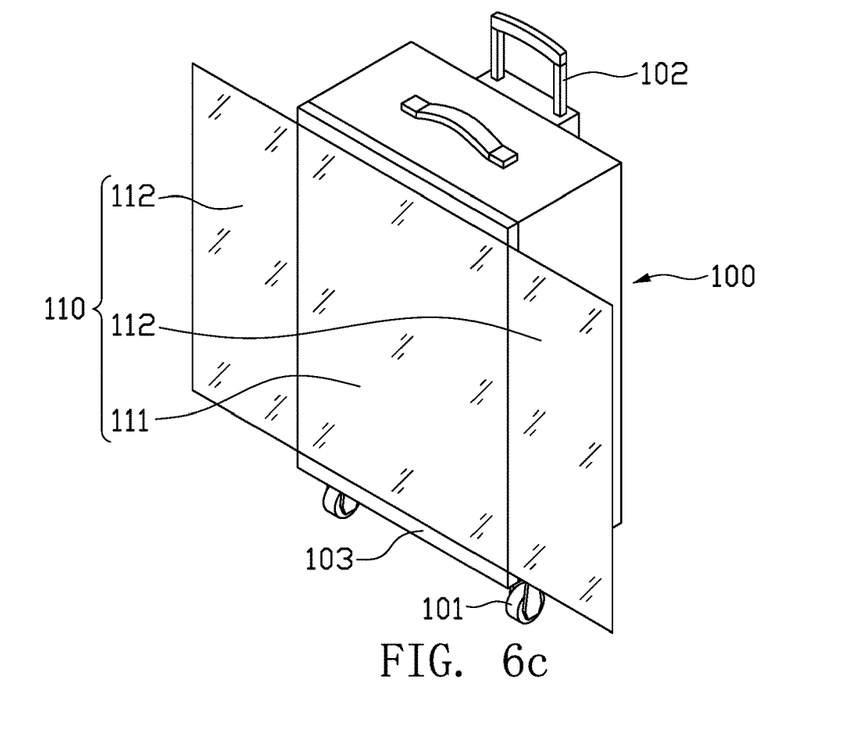
FIG. 6c is a schematic view showing the display screen of a suitcase in an unfolded state according to the fifth embodiment of the present application.

Referring from FIG. 6a to FIG. 6c, the main difference between the suitcase provided according to the fifth embodiment of the present invention and the above first embodiment is that, in this embodiment, the at least one second display unit 112 has two in number, and the two second display units 112 are rotatably connected to two opposite side edges of the first display unit 111, respectively. In the unfolded state, the two second display unit 112 are located at two opposite sides of the first display unit 111, respectively.

In this embodiment, the display area of the first display unit 111 wholly covers the outer surface of the case body 100 on which the display screen 110 is provided. However, the display area of each second display unit 112 is one half of the display area of the first display unit 111.

In this embodiment, after the second display unit 112 is unfolded, the expanded screen size will exceed the outer surface of the case body 100, thereby effectively increasing the display area of the screen, so that even if the suitcase has a small size, such as less than 20 inches, a relatively large display area can be obtained after unfolding the second display unit 112 of the foldable display screen 110.

Sixth Embodiment

Figure 7A:
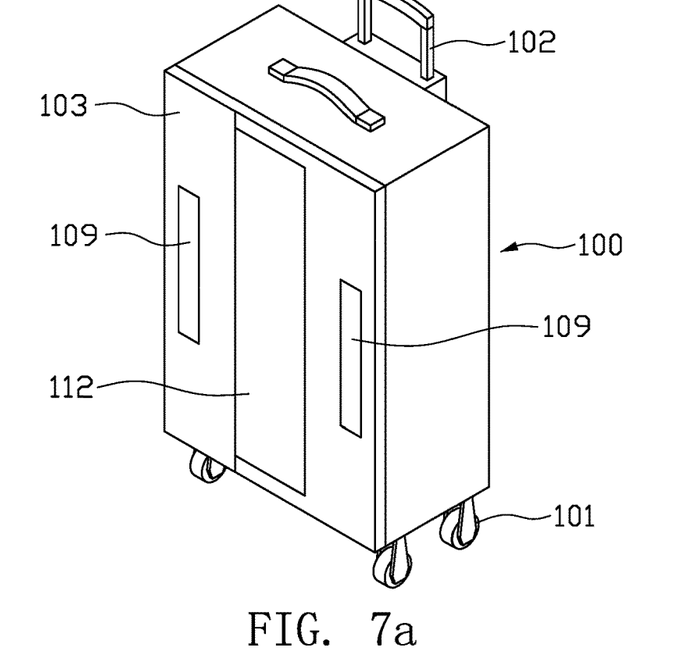
FIG. 7a is a schematic view showing the display screen of a suitcase in a folded state according to a sixth embodiment of the present application.
Figure 7B:
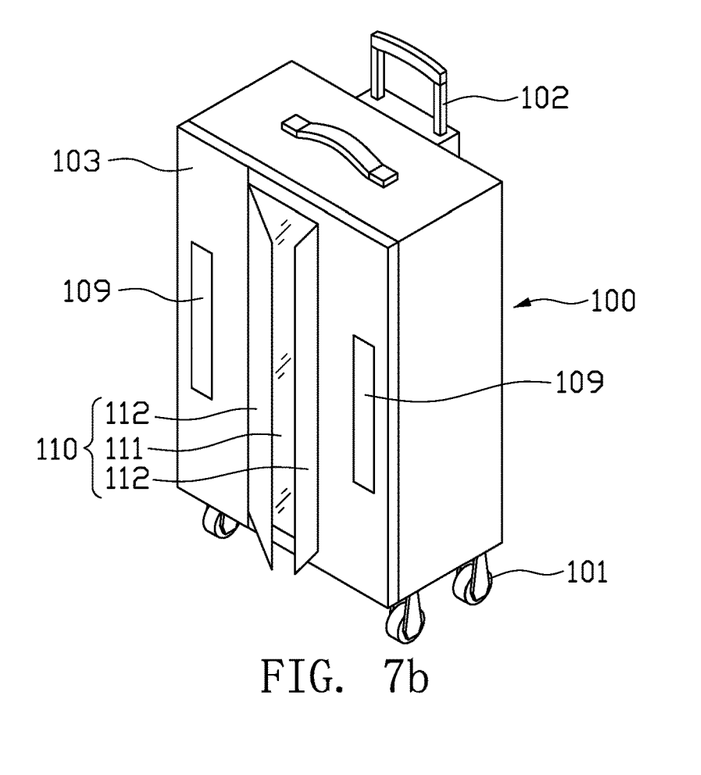
FIG. 7b is a schematic view showing the display screen of a suitcase being unfolded from a folded state towards an unfolded state according to the sixth embodiment of the present application.
Figure 7C:
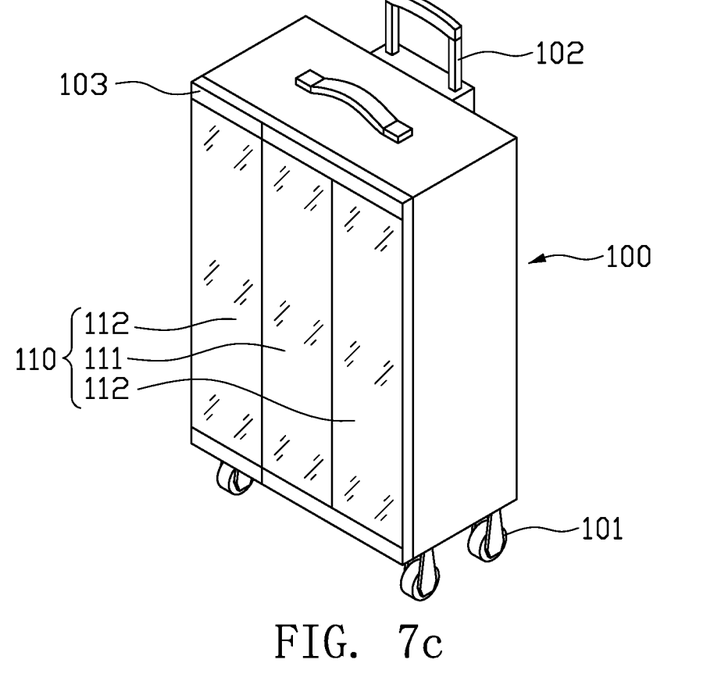
FIG. 7c is a schematic view showing the display screen of a suitcase in an unfolded state according to the sixth embodiment of the present application.

Referring from FIG. 7a to FIG. 7c, the main difference between the suitcase provided according to the sixth embodiment of the present invention and the above first embodiment is that, in this embodiment, the at least one second display unit 112 has two in number, and the two second display units 112 are rotatably connected to two opposite side edges of the first display unit 111, respectively. In the unfolded state, the two second display unit 112 are located at two opposite sides of the first display unit 111, respectively.

In this embodiment, the first display unit 111 is located in the middle portion of the outer surface of the case body 100 on which the display screen 110 is provided, and the display area of the first display unit 111 covers one third of the outer surface of the case body 100 on which the display screen 110 is provided. The display area of each second display unit 112 is equal to that of the first display unit 111.

In this embodiment, after the second display unit 112 is unfolded, the expanded screen size after unfolding is basically the same as that of the outer surface of the case body 100. When the suitcase has a large size, such as larger than 20 inches, a relatively large display area can be obtained after unfolding the second display unit 112 of the foldable display screen 110.

In this embodiment, for the outer surface of the case body 100 on which the display screen 110 is provided, a plurality of storage pockets 109 are provided in the areas without the screen. The storage pockets 109 can be used to conveniently place some daily necessities, such as paper towels, etc.

The present application further provides a suitcase system, which includes an electronic device 200 and a suitcase of either one of the above embodiments. The electronic device 200 is connected to the suitcase wirelessly. As a result, the information content in the electronic device 200 can be transmitted to the display screen 110 of the suitcase for display. Due to the foldable structure of the display screen 110, the second display unit 112 can be unfolded relative to the first display unit 111, to effectively increase the display area in displaying, so that the users can enjoy the display effect of a large screen when watching videos or sharing information with others in the course of business trips, thereby enhancing the user experience.

The electronic device 200 may be mobile phones, tablets, laptops or wearable devices, etc.

The above are embodiments of the present application only, and should not be deemed as limitations to the present application. Although the present application has been disclosed in embodiments as above, it is not intended to limit the present application. It should be noted that variations and improvements will become apparent to those skilled in the art to which the present application pertains. Therefore, the scope of the present application is defined by the appended claims.

What is claimed is:

1. A suitcase comprising a case body, the case body being provided with rolling wheels and a pull rod, wherein a foldable display screen is provided on an outer surface of the case body, the display screen comprises a fixed first display unit and at least one second display unit which is foldable relative to the first display unit, when the display screen is in the folded state, the at least one second display unit is folded on and overlapped with the first display unit, after the at least one second display unit is unfolded relative to the first display unit, the display screen is in the unfolded state, and the display area of the display screen is equal to the sum of the first display unit and the at least one second display unit;

the suitcase further comprises a wireless module, the suitcase connects with the Internet or connects with an electronic device of a user via the wireless module to automatically acquire the flight information of the user and obtain the actual take-off time and landing time of the flight, such that a flight mode is automatically opened at the take-off time of the flight and automatically closed at the landing time of the flight.

2. The suitcase of claim 1, wherein the display screen is a flexible display screen.

3. The suitcase of claim 1, wherein the display screen is provided on a front surface, a rear surface or two side surfaces of the case body.

4. The suitcase of claim 1, wherein the at least one second display unit is a single one, the second display unit is rotatably connected with a side edge of the first display unit, and in the unfolded state, the second display unit is located at one side of the first display unit.

5. The suitcase of claim 4, wherein the display area of the first display unit wholly covers the outer surface of the case body on which the display screen is provided, and the display area of the second display unit is equal to that of the first display unit.

6. The suitcase of claim 5, wherein a plurality of support bars are provided on the case body, and each support bar is rotatably connected to the case body, the support bars are configured to rotate outwards from the case body to support the back portion of the unfolded second display unit when the second display unit is in the unfolded state, and configured to rotate back to the case body when the second display unit is in the folded state and no support is needed.

7. The suitcase of claim 4, wherein the display area of the first display unit covers one half of the case body on which the display screen is provided, and the display area of the second display unit is equal to that of the first display unit.

8. The suitcase of claim 1, wherein the at least one second display unit has two in number, the two second display units are rotatably connected to two opposite side edges of the first display unit, and in the unfolded state, the two second display units are located at two opposite sides of the first display unit.

9. The suitcase of claim 8, wherein the display area of the first display unit wholly covers the outer surface of the case body on which the display screen is provided, and the display area of each second display unit is equal to that of the first display unit.

10. The suitcase of claim 8, wherein the display area of the first display unit wholly covers the outer surface of the case body on which the display screen is provided, and the display area of each second display unit is one half of the display area of the first display unit.

11. The suitcase of claim 8, wherein the first display unit is located in the middle portion of the case body on which the display screen is provided, the display area of the first display unit covers one third of the outer surface of the case body on which the display screen is provided, and the display area of each second display unit is equal to that of the first display unit.

12. The suitcase of claim 1, wherein the suitcase further comprises a battery and an electric generator, the electric generator is connected with the battery and the rolling wheels, the electric generator is used to generate electricity under the driving of the rolling wheels for charging the battery.

13. The suitcase of claim 1, wherein the suitcase further comprises a positioning module, the positioning module is used to locate the position of the suitcase in real time, and the positioning information of the suitcase is sent to the electronic device of the user through the wireless module.

14. The suitcase of claim 1, wherein the suitcase further comprises a processor, a memory and an operating system, the memory is connected to the processor, the display screen has touch input function.

15. The suitcase of claim 1, wherein a receiving groove is provided in the outer surface of the case body on which the display screen is provided, the second display unit is received in the receiving groove and fixed to the case body when the second display unit is in the folded state.

16. A suitcase system comprising an electronic device and a suitcase of claim 1, the electronic device and the suitcase being connected wirelessly.

* * * * *